(12) United States Patent
Lanoe et al.

(10) Patent No.: US 10,867,724 B1
(45) Date of Patent: Dec. 15, 2020

(54) METHOD FOR FORMING POWER OVER ETHERNET TWISTED PAIR COMMUNICATION CABLES

(71) Applicant: Superior Essex International LP, Atlanta, GA (US)

(72) Inventors: Thibaut Oscar Lanoe, Atlanta, GA (US); Nathan Spare, Ellinwood, KS (US)

(73) Assignee: Superior Essex International LP, Atlanta, GA (US)

( * ) Notice: Subject to any disclaimer, the term of this patent is extended or adjusted under 35 U.S.C. 154(b) by 338 days.

(21) Appl. No.: 15/679,564

(22) Filed: Aug. 17, 2017

(51) Int. Cl.
| H01B 11/04 | (2006.01) |
| H04L 12/10 | (2006.01) |
| H01B 11/10 | (2006.01) |
| H01B 13/02 | (2006.01) |
| H01B 7/18 | (2006.01) |

(52) U.S. Cl.
CPC ............. *H01B 11/04* (2013.01); *H01B 11/10* (2013.01); *H01B 13/02* (2013.01); *H04L 12/10* (2013.01); *H01B 7/18* (2013.01)

(58) Field of Classification Search
CPC ........... H01B 11/04; H01B 7/18; H04L 12/10; H04N 7/14
See application file for complete search history.

(56) References Cited

U.S. PATENT DOCUMENTS

| 3,160,702 A | 12/1964 | Lapsley |
| 3,594,492 A | 7/1971 | Bahder |
| 4,408,443 A | 10/1983 | Brown |
| 4,639,544 A | 1/1987 | Dableh |
| 5,077,449 A | 12/1991 | Cornibert et al. |
| 5,399,813 A | 3/1995 | McNeill |
| 5,424,491 A | 6/1995 | Walling |
| 5,514,837 A | 5/1996 | Kenny |
| 5,770,820 A | 6/1998 | Nelson |
| 5,902,962 A | 5/1999 | Gazdzinski |
| 6,153,826 A | 11/2000 | Kenny |
| 6,304,089 B1 | 10/2001 | Paulson |
| 7,241,951 B2 | 7/2007 | Danazzi |
| 8,669,474 B2 | 3/2014 | Battle |
| 9,805,844 B2 | 10/2017 | Bopp et al. |

(Continued)

OTHER PUBLICATIONS

General Cable, "GenSPEED EFFICIENC MAX Category 6A 10 Gig Cabie for High-Power PoE Applications, Featuring Mosaic Crossblock Technology Product Sheet" (Year: 2014).*

(Continued)

*Primary Examiner* — Livius R. Cazan (57) ABSTRACT

In a method for forming a Category 6A communication cable suitable for Power over Ethernet applications, four pairs of individually insulated conductors may be provided, and each of the conductors may have a diameter of at least approximately 0.0240 inches. A respective twist lay for each of the pairs may be selected to result in the communications cable having a propagation delay skew of less than approximately 45 nanoseconds per one hundred meters and a direct current resistance unbalance between any two of the four pairs of less than approximately one hundred milliohms per one hundred meters. Each of the four pairs may be twisted based at least in part on the selected twist lays, and a jacket may be formed around the four twisted pairs.

19 Claims, 5 Drawing Sheets

(56) References Cited

U.S. PATENT DOCUMENTS

| | | | |
|---|---|---|---|
| 9,842,672 | B2 | 12/2017 | Jiang et al. |
| 2003/0168242 | A1 | 9/2003 | Whidden |
| 2005/0173149 | A1 | 8/2005 | Gouge |
| 2006/0137894 | A1 | 6/2006 | Cusson |
| 2007/0102188 | A1 | 5/2007 | Glew |
| 2010/0141282 | A1 | 6/2010 | Heath et al. |
| 2011/0127064 | A1* | 6/2011 | Rivernider, Jr. ... H01B 11/1033 174/106 R |
| 2014/0238720 | A1 | 8/2014 | Kroishl |
| 2014/0293994 | A1 | 10/2014 | Pepe et al. |
| 2015/0206629 | A1 | 7/2015 | Ona |
| 2017/0229214 | A1 | 8/2017 | Mashio |

OTHER PUBLICATIONS

TIA-568-C.2 Standard (Year: 2009).*
Darshan Y., "IEEE802.3 4P Study Group Predicting Cable P2P Resistance Unbalance (P2PRunb) from existing cabling parameters" (Year: 2013).*
AT&T, "U/FTP vs F/UTP CAT6A LAN Cables", obtained at http://cabling.att.com/includes/U-FTP_vs_F-UTP_CAT6A_LAN_Cables.pdf (Year: 2016).*
Communications Wire & Cable, Superior Essex, https://platt.com/CutSheets/Superior Essex/SupEss cat.pdf (Year: 2008).*
ASTM Standard B258, 2018, "Standard Specification for Standard Nominal Diameters and Cross-Sectional Areas of AWG Sizes of Solid Roun," ASTM International, West Conshohocken, PA, 2003, DOI: 10.1520/B0258-18, www.astm.org (Year: 2018).*
Peterson, "The Math Forum—Ask Dr. Math", Nov. 15, 1998 http://mathforum.org/library/drmath/view/53155.html (Year: 1998).*
ComCables, "Cat 6A UTP 500 MHz Plenum Cable", https://web.archive.org/web/20160702102544/http://www.comcables.com/product-cat-6a-utp-500mhz-plenum-cable (Year: 2016).*
Notice of Allowance for U.S. Appl. No. 15/933,873, dated Feb. 27, 2019.
General Cable, "GenSPEED EFFICIENC MAX Category 6A 10 Gig Cable for High-Power PoE Applications, Featuring Mosaic Crossblock Technology Product Sheet", 2014.
Notice of Allowance for U.S. Appl. No. 15/679,545, dated Oct. 15, 2018.
Office Action for U.S. Appl. No. 15/679,545, dated May 3, 2018.

* cited by examiner

METHOD FOR FORMING POWER OVER ETHERNET TWISTED PAIR COMMUNICATION CABLES

CROSS-REFERENCES TO RELATED APPLICATION

This application is related to pending U.S. patent application Ser. No. 15/679,545, filed Aug. 17, 2017 and entitled "Power Over Ethernet Twisted Pair Communication Cables", the contents of which is incorporated herein by reference in its entirety.

TECHNICAL FIELD

Embodiments of the disclosure relate generally to communication cables and, more particularly, to methods for forming twisted pair communication cables suitable for use in Power over Ethernet applications.

BACKGROUND

A wide variety of different types of communication cables are utilized to transmit information. For example, twisted pair communication cables are utilized to transmit Ethernet and other data signals. In certain applications, twisted pair cables are utilized to provide both data signals and electrical power to a wide variety of devices, such as lighting devices, wireless access points, etc. Typically, electrical power is provided over twisted pairs in accordance with a Power over Ethernet ("PoE") standard. As electrical power requirements increase, the sizes of twisted pair conductors are also increases. Increased conductor sizes make it more difficult to engineer or design twisted pair cables that satisfy crosstalk, noise, and other applicable electrical performance requirements. These challenges are exacerbated as bandwidth requirements increase. Accordingly, there is an opportunity for improved twisted pair communication cables suitable for PoE applications. Additionally, there is an opportunity for improved Category 6A communication cables suitable for PoE applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to twisted pair cables suitable for use in Power over Ethernet ("PoE") applications. According to an aspect of the disclosure, a communication cable may include a plurality of twisted pairs of individually insulated conductors, and each conductor may be a 22 American Wire Gauge ("AWG") or greater conductor. For example, each conductor may have a diameter that is equal to or greater than approximately 0.0240 inches. Additionally, the twisted pairs may be capable of transmitting approximately 100 Watts of power at approximately 1.0 ampere per pair over a distance of approximately 100 meters with at least approximately 88% efficiency. In certain embodiments, a suitable separator may be positioned between two or more of the twisted pairs and/or one or more shield layers may be formed around various twisted pairs and/or groups of pairs. A jacket may then be formed around the twisted pairs and/or other cable components. Conventional twisted pair conductors typically have smaller sizes or diameters and are not capable of transmitting the same level of power as the conductors described herein. For example, many conventional twisted pair conductors are 23 AWG conductors having a relatively smaller diameter.

According to another aspect of the disclosure, the communication cable may satisfy one or more electrical requirements of a Category 6A standard, such as standard 568 set forth by the Telecommunications Industry Association ("TIA"). For example, the communication cable and/or any two twisted pairs of the communication cable may have a propagation delay skew of less than approximately forty-five nanoseconds (45 ns) per one hundred meters (100 m). As another example, the communication cable and/or any two twisted pairs of the communication cable may have a direct current resistance unbalance of less than approximately one hundred milliohms (100 mΩ) per one hundred meters (100 m).

In certain embodiments, each of the twisted pairs of a communication cable may have a different twist lay or lay length. The different twist lays may assist in reducing crosstalk between the twisted pairs. Additionally, according to an aspect of the disclosure, the twist lays may be selected or determined in order to result in a cable that satisfies desired propagation delay skew, direct current resistance unbalance between pairs, and/or other Category 6A requirements. With the relatively larger conductor sizes utilized in the cable, the twist lays may be specifically engineered and/or selected in order to satisfy electrical requirements. Additionally, the higher transmission frequency requirements of Category 6A require relatively tighter twists (i.e., relatively smaller twist lays) than conventional PoE cables, such as cables that satisfy Category 5 or Category 5e requirements. In certain embodiments, each of the twisted pairs may have a different respective twist lay included in a range between approximately 0.292 inches and approximately 0.504 inches. In an example four twisted pair cable, a first twisted pair may have a twist lay between approximately 0.292 inches and approximately 0.357 inches; a second twisted pair may have a twist lay between approximately 0.377 inches and approximately 0.461 inches; a third twisted pair may have a twist lay between approximately 0.311 inches and approximately 0.380 inches; and a fourth twisted pair may have a twist lay between approximately 0.412 inches and approximately 0.504 inches.

Other embodiments of the disclosure are directed to methods for forming twisted pair communication cables. A plurality of individually insulated conductors may be provided, and each of the conductors may be a 22 American Wire Gauge ("AWG") or greater conductor. For example, each conductor may have a diameter that is equal to or greater than approximately 0.0240 inches. A different respective twist lay for each of plurality of pairs of the conductors may be selected or determined in order to result in a twisted pair communication cable that satisfies one or more electrical requirements of a Category 6A standard, such as TIA-568. For example, twist lays may be selected to result in a cable having a propagation delay skew of less than approximately 45 ns per 100 m and/or a direct current resistance unbalance between pairs of less than approximately 100 mΩ. Pairs of the conductors may then be twisted together in accordance with the selected or determined twist lays in order to form a plurality of twisted pairs. A jacket may then be formed around the plurality of twisted pairs. In certain embodiments, a separator and/or one or more shield layers may be incorporated into the communication cable prior to forming the jacket.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
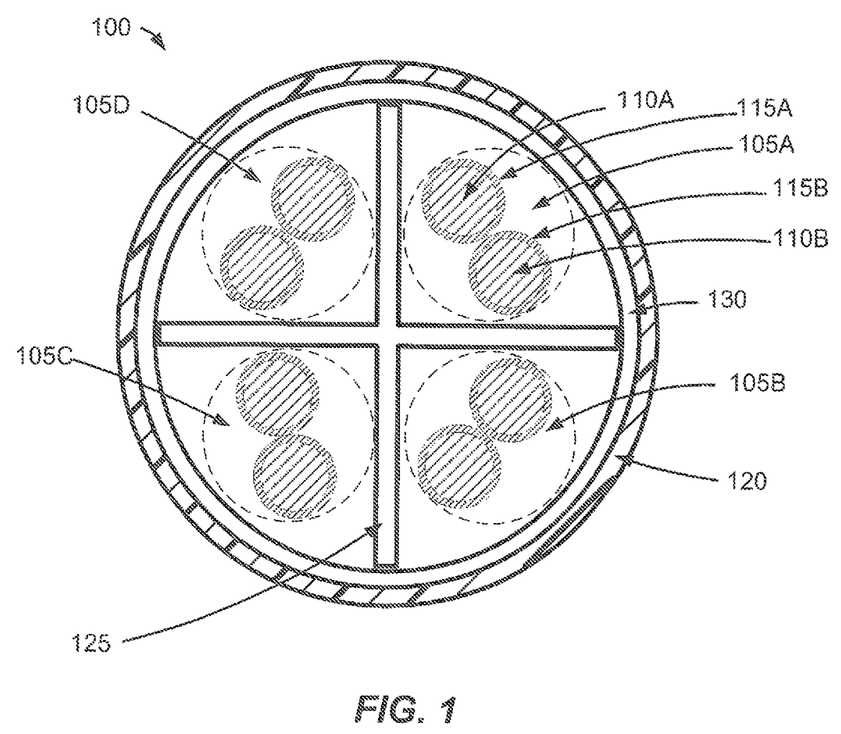
FIG. 1 is a cross-sectional view of an example twisted pair cable suitable for use in Power over Ethernet applications, according to an illustrative embodiment of the disclosure.

With reference to FIG. 1, a cross-section of an example cable 100 suitable for use in PoE applications is illustrated. The cable 100 is illustrated as a twisted pair communications cable; however, embodiments of the disclosure may additionally be applicable to composite or hybrid cables that include a combination of twisted pairs and other transmission media (e.g., optical fibers, etc.). Indeed, suitable cables may include any number of transmission media including but not limited to one or more twisted pairs, optical fibers, coaxial cables, and/or power conductors.

As shown in FIG. 1, the cable 100 may include four twisted pairs 105A, 105B, 105C, 105D; however, any other suitable number of pairs may be utilized. Each twisted pair (referred to generally as twisted pair 105) may include two electrical conductors 110A, 110B, each covered with respective insulation 115A, 115B. The electrical conductors (generally referred to as conductor 110) of a twisted pair 105 may be formed from any suitable electrically conductive material, such as copper, aluminum, silver, annealed copper, gold, a conductive alloy, etc. Additionally, the electrical conductors 110 may have any suitable diameter, gauge, and/or other dimensions. Further, each of the electrical conductors 110 may be formed as either a solid conductor or as a conductor that includes a plurality of conductive strands that are twisted together.

According to an aspect of the disclosure, the electrical conductors 110 of certain twisted pairs (e.g., illustrated twisted pairs 105A-D, etc.) may be 22 AWG or larger conductors. In other words, electrical conductors 110 may have a diameter and/or cross-sectional area that is greater than or equal to required minimum dimensions for 22 AWG conductors. For example, electrical conductors 110 may have a diameter that is greater than or equal to approximately 0.0240 inches (0.6096 mm). In various embodiments, electrical conductors 110 may have diameters that are greater than or equal to approximately 0.0240, 0.0245, 0.0250, 0.0252, 0.0253, 0.0255, 0.0257, 0.0259, 0.0260, 0.0265, or 0.0271 inches, or diameters incorporated in a range between any two of the above values. Additionally, the electrical conductors 110 and/or certain twisted pairs may be capable of transmitting a desired power signal for PoE applications. For example, a desired number of twisted pairs (e.g., the illustrated four twisted pairs 105A-D, etc.) may be capable of transmitting approximately 100 Watts of power at approximately 1.0 ampere per pair over a distance of approximately 100 meters with at least approximately 88% efficiency at a temperature of approximately twenty degrees Celsius (20° C.). In certain embodiments, each example twisted pair 105 may be capable of transmitting a desired portion of the overall power. For example, each set of two twisted pairs (e.g., twisted pairs 105A-B and 105C-D, etc.) may be capable of transmitting approximately 50 Watts of power. The power transmitted by each set of twisted pairs may be equal to the current carried by each twisted pair multiplied by the voltage between the two twisted pairs. The current and/or voltage on/between each twisted pair may be adjusted as desired in order to attain a desired power signal. As one example, each conductor of a twisted pair 105 may carry an approximately 0.5 ampere signal. Thus, a combined signal of approximately 1.0 ampere may be transmitted on a twisted pair. Other suitable power transmission requirements may be utilized as desired in other embodiments.

The twisted pair insulation (generally referred to as insulation 115) may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each of the electrical conductors utilized in the twisted pairs 105A-D may be formed from similar materials. In other embodiments, at least two of the twisted pairs may utilize different insulation materials. In yet other embodiments, the two conductors that make up a twisted pair 105 may utilize different insulation materials. As desired in certain embodiments, insulation may additionally include a wide variety of other materials (e.g., filler materials, materials compounded or mixed with a base insulation material, etc.), such as smoke suppressant materials, flame retardant materials, etc.

In various embodiments, twisted pair insulation 115 may be formed from one or multiple layers of insulation material. A layer of insulation may be formed as solid insulation, unfoamed insulation, foamed insulation, or other suitable insulation. As desired, combination of different types of insulation may be utilized. For example, a foamed insulation layer may be covered with a solid foam skin layer. As desired with foamed insulation, different foaming levels may be utilized for different twisted pairs in accordance with twist lay length to assist in balancing propagation delays between the twisted pairs. In certain embodiments, desired twisted pairs (e.g., twisted pairs 105A-D) incorporated into the cable 100 may have insulation that is formed from or that includes FEP. For example, the conductors of the twisted pairs 105A-D may be insulated with solid FEP insulation. Additionally, the insulation 115 may be formed with any suitable thickness, inner diameter, outer diameter, and/or other dimensions.

Each twisted pair 105 can carry data or some other form of information, for example in a range of about one to ten Giga bits per second ("Gbps") or other suitable data rates, whether higher or lower. In certain embodiments, each twisted pair 105 supports data transmission of about two and one-half Gbps (e.g. nominally two and one-half Gbps), with the cable 100 supporting about ten Gbps (e.g. nominally ten Gbps). In certain embodiments, each twisted pair 105 supports data transmission of up to about ten Gbps (e.g. nominally ten Gbps), with the cable 100 supporting about forty Gbps (e.g. nominally forty Gbps).

According to an aspect of the disclosure, a desired number of the twisted pairs may be formed with different respective twist lays. For example, in the illustrated four pair cable, each of the twisted pairs 105A-D may have a different twist lay. The different twist lays may function to reduce crosstalk between the twisted pairs, and a wide variety of suitable twist lay configurations may be utilized. According to an aspect of the disclosure, the respective twist lays for the twisted pairs 105A-D may be selected, calculated, or determined in order to result in a cable 100 that satisfies one or more standards and/or electrical requirements. For example, twist lays may be selected such that the cable 100 satisfies one or more electrical requirements of a Category 6A standard, such as the TIA 568 standard set forth by the Telecommunications Industry Association. As another example, the twist lays may be selected such that the cable 100 has a propagation delay skew of less than approximately forty-five nanoseconds (45 ns) per one hundred meters (100 m). In other words, the twist lays of the desired twisted pairs may be selected such that the propagation delay skew between any two pairs is less than 45 ns per 100 m. As another example, the twist lays may be selected such that the cable 100 has a direct current resistance unbalance between pairs of less than approximately one hundred milliohms (100 mΩ) per one hundred meters (100 m). In other words, the twist lays of the desired twisted pairs may be selected such that the direct current resistance unbalance between any two pairs is less than approximately 100 mΩ per 100 m. Twist lays may be selected in order to satisfy a wide variety of other electrical requirements as desired in various embodiments.

In certain embodiments, each of the twisted pairs 105A-D suitable for use in a PoE application may have a twist lay included in a range between approximately 0.292 inches and approximately 0.504 inches. For example, each of the twisted pairs 105A-D may have a different twist lay with each respective twist lay being between approximately 0.292 inches and approximately 0.504 inches. In other embodiments, each of the twisted pairs 105A-D may have a different twist lay with each respective twist lay being between approximately 0.304 inches and approximately 0.487 inches. In yet other embodiments, each of the twisted pairs 105A-D may have a different twist lay with each respective twist lay being between approximately 0.308 inches and approximately 0.481 inches. Indeed, a wide variety of suitable ranges of twist lays may be utilized as desired. In various embodiments, a minimum value for a twist lay range may be approximately 0.292, 0.299, 0.304, 0.309, 0.315, or 0.325 inches. A maximum value for a twist lay range may be approximately, 0.458, 0.467, 0.481, 0.487, 0.494, or 0.504 inches. A suitable twist lay range may be formed using any combination of the minimum or maximum values listed above.

In an example four twisted pair cable, such as the cable 100 illustrated in FIG. 1, a first twisted pair 105A may have a twist lay between approximately 0.292 inches and approximately 0.357 inches; a second twisted pair 105B may have a twist lay between approximately 0.377 inches and approximately 0.461 inches; a third twisted pair 105C may have a twist lay between approximately 0.311 inches and approximately 0.380 inches; and a fourth twisted pair 105D may have a twist lay between approximately 0.412 inches and approximately 0.504 inches. As another example, a first twisted pair 105A may have a twist lay between approximately 0.304 inches and approximately 0.346 inches; a second twisted pair 105B may have a twist lay between approximately 0.392 inches and approximately 0.446 inches; a third twisted pair 105C may have a twist lay between approximately 0.323 inches and approximately 0.367 inches; and a fourth twisted pair 105D may have a twist lay between approximately 0.429 inches and approximately 0.487 inches.

In one example embodiment, a first twisted pair 105A may have a twist lay of approximately 0.325 inches, a second twisted pair 105B may have a twist lay of approximately 0.419 inches, a third twisted pair 105C may have a twist lay of approximately 0.345 inches, and a fourth twisted pair 105D may have a twist lay of approximately 0.458 inches. The illustrated positions of the various twisted pairs 105A-D in the cable 100 of FIG. 1 may be varied or modified as desired in various embodiments. In other words, the first twisted pair 105A is not required to be positioned in a top right quadrant, and so on. Additionally, the twisted pairs 105A-D positions relative to one another may be varied or modified as desired.

In certain embodiments, the differences between twist lays of twisted pairs 105 that are circumferentially adjacent one another (for example the twisted pair 105A and the twisted pair 105B) may be greater than the differences between twist lays of twisted pairs 105 that are diagonal from one another (for example the twisted pair 105A and the twisted pair 105C). As a result of having similar twist lays, the twisted pairs that are diagonally disposed can be more susceptible to crosstalk issues than the twisted pairs 105 that are circumferentially adjacent; however, the distance between the diagonally disposed pairs may limit the crosstalk. Thus, the different twist lays and arrangements of the pairs can help reduce crosstalk among the twisted pairs 105.

As desired, the plurality of twisted pairs 105A-D may be twisted together with an overall twist or bunch. Any suitable overall twist lay or bunch lay may be utilized, such as a bunch lay between approximately 1.9 inches and approximately 15.0 inches. For example, a bunch lay may be approximately 1.9, 2.0, 2.5, 3.0, 3.5, 3.75, 4.0, 4.25, 4.5, 4.75, 5.0, 5.5, 6.0, 7.0, 7.5, 8.0, 9.0, 10.0, 11.0, 12.0, or 15.0 inches, or any value included in a range between two of the previously listed values (e.g., a bunch lay between approximately 3.5 and approximately 4.5 inches, etc.), or any value included in a range bounded on either a minimum or maximum end by one of the above values (e.g., a bunch lay that is less than or equal to approximately 4.25 inches, etc.). In certain embodiments, a bunch lay may be between approximately 3.75 inches and approximately 4.25 inches. For example, a bunch lay may be approximately 4.0 or approximately 4.08 inches.

The example twist lays discussed above may be final twist lays for the twisted pairs 105A-D. In certain embodiments, one or more of the twisted pairs 105A-D may be formed with initial twist lays, and the initial twist lays may be modified to resultant or final twist lays during the overall twisting or bunching of the twisted pairs 105A-D. Overall twisting in the same direction as one or more of the twisted pairs 105A-D may result in tightening the initial twist lays of the one or more pairs 105A-D. Conversely, overall twisting in an opposite direction as one or more of the twisted pairs 105A-D may result in loosening the initial twist lays.

In certain embodiments, the twisted pairs 105A-D may each be twisted in the same direction (e.g., clockwise, counter clockwise). An overall twist or bunching may then be formed in the same direction as the twisted pairs 105A-D. As a result, each of the respective initial twist lays may be tightened or shortened during the overall twisting. As one non-limiting example, a first twisted pair 105A may have an initial twist lay of approximately 0.353 inches, a second twisted pair 105B may have an initial twist lay of approximately 0.467 inches, a third twisted pair 105C may have an initial twist lay of approximately, 0.377 inches, and a fourth twisted pair 105D may have an initial twist lay of approximately 0.516 inches. An overall twist or bunch may be performed on the twisted pairs 105A-D with a lay length of approximately 4.08 inches. As a result of the overall twisting or bunching, the first twisted pair 105A may have a twist lay of approximately 0.325 inches, a second twisted pair 105B may have a twist lay of approximately 0.419 inches, a third twisted pair 105C may have a twist lay of approximately 0.345 inches, and a fourth twisted pair 105D may have a twist lay of approximately 0.458 inches.

In other embodiments, the twisted pairs 105A-D may each be twisted in the same direction, and an overall twist may then be formed in an opposite direction. As a result, each of the respective initial twist lays of the twisted pairs 105A-D may be loosened or lengthened during the overall twisting. In yet other embodiments, a first portion of the twisted pairs 105A-D may have a twist direction that is the same as the overall twist direction while a second portion of the twisted pairs 105A-D may have a twist direction that is opposite that of the overall twist direction. As a result, the initial twist lay(s) of the first portion of twisted pairs may be tightened while the initial twist lay(s) of the second portion of twisted pairs may be loosened during the overall twisting. Any number of twisted pairs may be included in either the first portion or the second portion. Indeed, a wide variety of suitable combinations of twist lays and/or twist directions may be utilized as desired in order to obtain twisted pairs with desired final or resultant twist lays.

As desired in certain embodiments, one or more suitable bindings or wraps may be wrapped or otherwise formed around the twisted pairs 105A-D once they are twisted together. Additionally, in certain embodiments, multiple grouping of twisted pairs may be incorporated into a cable. As desired, each grouping may be twisted, bundled, and/or bound together. Further, in certain embodiments, the multiple groupings may be twisted, bundled, or bound together.

With continued reference to FIG. 1, a jacket 120 may enclose the internal components of the cable 100, seal the cable 100 from the environment, and/or provide strength and structural support. The jacket 120 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. For example, a PVC jacket or a jacket containing PVC material may be used in certain embodiments. The jacket 120 may be formed as a single layer or, alternatively, as multiple layers. In certain embodiments, the jacket 120 may be formed from one or more layers of foamed material. As desired, the jacket 120 can include flame retardant and/or smoke suppressant materials. The jacket 120 may be formed to result in a round cable or a cable having an approximately circular cross-section; however, the jacket 120 and internal components may be formed to result in other desired shapes, such as an elliptical, oval, or rectangular shape. The jacket 120 may also have a wide variety of suitable dimensions, such as any suitable or desirable outer diameter and/or any suitable or desirable wall thickness. In various embodiments, the jacket 120 can be characterized as an outer jacket, an outer sheath, a casing, a circumferential cover, or a shell.

An opening enclosed by the jacket 120 may be referred to as a cable core, and the twisted pairs 105A-D and/or other cable components may be disposed within the cable core. Although a single cable core is illustrated in the cable 100 of FIG. 1, a cable may be formed to include multiple cable cores. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, water absorbing materials, and/or strength members, depending upon application goals.

As desired in various embodiments, a suitable separator 125, spline, or filler may be positioned between two or more of the twisted pairs 125. The separator 125 may be disposed within the cable core and configured to orient and or position one or more of the twisted pairs 105A-D. The orientation of the twisted pairs 105A-D relative to one another may provide beneficial signal performance. As desired in various embodiments, the separator 125 may be formed in accordance with a wide variety of suitable dimensions, shapes, or designs. For example, the separator 125 may be formed as an X-shaped separator or cross-fill. In other embodiments, a rod-shaped separator, a flat tape separator, a flat separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized.

In certain embodiments, the separator 125 may be continuous along a longitudinal length of the cable 100. In other embodiments, the separator 125 may be non-continuous or discontinuous along a longitudinal length of the cable 100. In other words, the separator 125 may be separated, segmented, or severed in a longitudinal direction such that discrete sections or portions of the separator 125 are arranged longitudinally (e.g., end to end) along a length of the cable 100. Use of a non-continuous or segmented separator may enhance the flexibility of the cable 100, reduce an amount of material incorporated into the cable 100, and/or reduce cost.

In certain embodiments, the separator 125 may be characterized as having projections that extend from a central portion or spine. For example, a cross-filler may be viewed as having a plurality of projections that extend in different directions from a central portion, spine, or central point. In certain embodiments, the projections of a separator 125 may be continuous along a longitudinal length of the separator 125 (or a separator section in a severed separator). In other embodiments, one or more projections of a separator 125 may have sections or portions that are spaced along a longitudinal length of the separator 125, and any suitable longitudinal gap or spacing may be positioned between longitudinally adjacent sections of a projection. Longitudinal gaps utilized between section of a projection may have any suitable lengths or sized, and gaps may be approximately equal in length and/or spacing (e.g., arranged in accordance with a desired pattern, etc.) or alternatively, arranged in a random or pseudo-random manner. The use of longitudinal spaces between adjacent sections of a projection or between adjacent sets of projections (e.g., spaced grouping of projections or prongs) may facilitate a reduction in material utilized to form the separator 125 and/or may enhance the flexibility of the separator 125 and the cable 100.

In certain embodiments, projections may extend from a central portion in different sets of one or more directions at longitudinally spaced locations. For example, a first set of one or more projections may extend in a first set of respective directions. A second set of one or more projections longitudinally adjacent to the first set may extend in a second set of respective directions, and at least one direction of extension in the second set may be different than the direction(s) of extension included in the first set. Regardless of whether longitudinal gaps are positioned between various sets of longitudinally spaced projections, any suitable number of projections (e.g., one, two, three, four, etc.) may extend at each longitudinally spaced location. In certain embodiments, directions of extension may be varied in order to reduce material utilized to form the separator 125 while still providing a separator 125 with a desired overall cross-sectional shape. For example, a separator 125 may function as a cross-filler that includes projections extending in four directions along a longitudinal length; however, at any given location along the longitudinal length, projections may not extend in all four directions. A wide variety of suitable configurations of projections may be utilized as desired. In certain embodiments, a single projection may extend from each longitudinally spaced location, and the projections may alternate directions of extension, for example, at approximately ninety degree (90°) angles or in accordance with any other suitable pattern. In other embodiments, two projections may extend from each longitudinally spaced location in opposite directions from a central portion, and the directions of extension may alternate by approximately one hundred and eighty degrees (180°) between adjacent spaced locations. In other embodiments, two projections may extend from each longitudinally spaced location with an approximately ninety degree (90°) angle between the two projections. The directions of extension for the two projections may then be varied between adjacent longitudinally spaced locations. In yet other embodiments, three projections may extend from each longitudinally spaced location, and a projection that is not present may be alternated or otherwise varied along a longitudinal length. For example, a projection that is not present may be alternated at approximately ninety degree (90°) angles at adjacent longitudinally spaced locations. Additionally, in certain embodiments, the same number of projections may extend from each of the longitudinally spaced locations. In other examples, different numbers of projections may extend from at least two longitudinally spaced locations. A wide variety of other projection configurations and/or variations may be utilized as desired.

For a cross-filler or other separator 125 that includes projections that extend between adjacent sets of twisted pairs 105A-D, each projection may be formed with a wide variety of suitable dimensions. For example, each projection may have a wide variety of suitable cross-sectional shapes at a given cross-sectional point perpendicular to a longitudinal direction of the separator 125, cross-sectional shapes taken along the longitudinal direction (e.g., rectangular, square, semi-circular, parallelogram, trapezoidal, triangular, etc.), cross-sectional areas, thicknesses, distances of projection (i.e., length of projection from the central portion), and/or longitudinal lengths. In certain embodiments, each projection may be formed with substantially similar dimensions. In other embodiments, at least two projections may be formed with different dimensions. Similarly, in certain embodiments, each projection may be formed from similar materials. In other embodiments, at least two projections may be formed from different materials.

A wide variety of suitable techniques may be utilized to form a separator 125. For example, in certain embodiments, material may be extruded, cast, molded, or otherwise formed into a desired shape to form the separator 125. In other embodiments, various components of a separator 125 may be separately formed, and then the components of the separator 125 may be joined or otherwise attached together via adhesive, bonding (e.g., ultrasonic welding, etc.), or physical attachment elements (e.g., staples, pins, etc.). In yet other embodiments, a tape may be provided as a substantially flat separator or formed into another desired shape utilizing a wide variety of folding and/or shaping techniques. For example, a relatively flat tape may be formed into an X-shape or cross-shape as a result of being passed through one or more dies. In other embodiments, a plurality of tapes may be combined in order to form a separator having a desired cross-sectional shape. For example, two tapes may be folded at approximately ninety degree angles and bonded together to form a cross-shaped separator. As another example, four tapes may be folded at approximately ninety degree angles and bonded to one another to form a cross-shaped separator. A wide variety of other suitable construction techniques may be utilized as desired. Additionally, in certain embodiments, a separator 125 may be formed to include one or more hollow cavities that may be filled with air or some other gas, moisture mitigation material, one or more optical fibers, one or more metallic conductors (e.g., a drain wire, etc.), shielding, or some other appropriate material or element.

The separator 125 (and/or various segments, projections, and/or other components of the separator 125) may be formed from a wide variety of suitable materials and/or combinations of materials as desired in various embodiments. For example, the separator 125 may include paper, metallic material (e.g., aluminum, ferrite, etc.), alloys, semi-conductive materials, ferrite ceramic materials, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 125 may be filled, unfilled, foamed, solid, homogeneous, or inhomogeneous and may or may not include additives (e.g., flame retardant and/or smoke suppressant materials). As desired, the separator 125 may include one or more strength members, fibers, threads, and/or yarns. Similarly, flame retardant material, smoke suppressants, and/or other desired substances may be blended or incorporated into a separator 125. In certain embodiments, a separator 125 may include or incorporate one or more shielding materials, such as electrically conductive shielding material, semi-conductive material, and/or dielectric shielding material (e.g., ferrite ceramic material, etc.). As a result of incorporating electrically conductive material, the separator 125 may function as a shielding element.

In certain embodiments, each segment of a severed or subdivided separator 125 may be formed from similar materials. In other embodiments, a separator 125 may make use of alternating materials in adjacent portions or segments. For example, a first portion or segment of the separator 125 may be formed from a first set of one or more materials, and a second portion or segment of the separator 125 may be formed from a second set of one or more materials. As one example, a relatively flexible material may be utilized in every other portion of a separator 125. As another example, flame retardant material may be selectively incorporated into desired portions of a separator 125. In this regard, material costs may be reduced while still providing adequate flame retardant qualities.

As desired in various embodiments, one or more shield elements or shielding elements may be incorporated into the cable 100. Each shielding element may incorporate one or more shielding materials, such as electrically conductive shielding material, semi-conductive material, and/or dielectric shielding material (e.g., ferrite ceramic material, etc.). As shown in FIG. 1, an overall shield 130 or shield layer may be formed around the plurality of twisted pairs 105A-D and the optional separator 125. In other embodiments, individual shield layers may be respectively formed around each of the twisted pairs 105A-D. In yet other embodiments, one or more shield layers may be formed around desired subgroups of the twisted pairs 105A-D. As set forth above, shielding material may also be incorporated into cable separators or fillers positioned between two or more of the pairs 105A-D. Similarly, shielding material may be incorporated into separation elements (e.g., film layers, etc.) that are positioned between the individual conductors of one or more twisted pairs. Indeed, a wide variety of suitable shielding configurations, shield elements, and/or combinations of shield elements may be utilized.

In certain embodiments, a shield layer, such as the shield layer 130 illustrated in FIG. 1, may be positioned within a cable core. In other embodiments, a shield layer may be incorporated into the outer jacket 120. For example, the shield layer 130 may be sandwiched between two other layers of outer jacket material, such as two dielectric layers. As another example, electrically conductive material or other shielding material may be injected or inserted into the outer jacket 120 or, alternatively, the outer jacket 120 may be impregnated with shielding material. A wide variety of other suitable shielding arrangements may be utilized as desired in other embodiments. Further, in certain embodiments, a cable may include a separate, armor layer (e.g., a corrugated armor, etc.) for providing mechanical protection.

The external or overall shield 130 will now be described herein in greater detail; however, it will be appreciated that other shield layers may have similar constructions. In certain embodiments, a shield 130 may be formed from a single segment or portion that extends along a longitudinal length of the cable 100. In other embodiments, a shield 130 may be formed from a plurality of discrete segments or portions positioned adjacent to one another along a longitudinal length of the cable 100. In the event that discrete segments or portions are utilized, in certain embodiments, gaps or spaces may exist between adjacent segments or portions. In other embodiments, certain segments may overlap one another. For example, an overlap may be formed between segments positioned adjacent to one another in a longitudinal direction.

As desired, a wide variety of suitable techniques and/or processes may be utilized to form a shield 130 (or a shield segment). For example, a base material or dielectric material may be extruded, poltruded, or otherwise formed. Electrically conductive material or other shielding material may then be applied to the base material. In other embodiments, shielding material may be injected into the base material. In other embodiments, dielectric material may be formed or extruded over shielding material in order to form a shield 130. Indeed, a wide variety of suitable techniques may be utilized to incorporate shielding material into a shield 130. In certain embodiments, the base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer.

In certain embodiments, the shield 130 (or individual shield segments) may be formed as a tape that includes both a dielectric layer and an electrically conductive layer (e.g., copper, aluminum, silver, an alloy, etc.) formed on one or both sides of the dielectric layer. Examples of suitable materials that may be used to form a dielectric layer include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, aramid materials, or dielectric material (s) that does not ordinarily conduct electricity. In certain embodiments, a separate dielectric layer and electrically conductive layer may be bonded, adhered, or otherwise joined (e.g., glued, etc.) together to form the shield 130. In other embodiments, electrically conductive material may be formed on a dielectric layer via any number of suitable techniques, such as the application of metallic ink or paint, liquid metal deposition, vapor deposition, welding, heat fusion, adherence of patches to the dielectric, or etching of patches from a metallic sheet. In certain embodiments, the conductive patches can be over-coated with an electrically insulating film, such as a polyester coating. Additionally, in certain embodiments, an electrically conductive layer may be sandwiched between two dielectric layers. In other embodiments, at least two electrically conductive layers may be combined with any number of suitable dielectric layers to form the shield 130. For example, a four layer construction may include respective electrically conductive layers formed on either side of a first dielectric layer. A second dielectric layer may then be formed on one of the electrically conductive layers to provide insulation between the electrically conductive layer and the twisted pairs 105A-D. Indeed, any number of suitable layers of material may be utilized in a shield 130.

Additionally, in certain embodiments, one or more separator elements (not shown) may be positioned between the individual conductors of a twisted pair 105. As desired, shielding material may be optionally incorporated into one or more separator elements positioned between the conductors of respective twisted pairs 105A-D. In certain embodiments, a twisted pair separator may be woven helically with the individual conductors or conductive elements of an associated twisted pair 105. In other words, a separator element may be helically twisted with the conductors of a twisted pair 105 along a longitudinal length of the cable 100.

Each separator element may have a wide variety of suitable constructions, components, and/or cross-sectional shapes. For example, each separator may be formed as a dielectric film that is positioned between the two conductors of a twisted pair 105. In other embodiments, a separator may be formed with an H-shape, an X-shape, or any other suitable cross-sectional shape. For example, the separator may be formed to create or define one or more channels in which the twisted pair conductors may be situated. In this regard, the separator may assist in maintaining the positions of the twisted pair conductors when stresses are applied to the cable, such as pulling and bending stresses. Additionally, in certain embodiments, a separator may include a first portion positioned between the conductors of a twisted pair 105 and one or more second portions that form a shield around an outer circumference of the twisted pair. The first portion may be helically twisted between the conductors, and the second portion(s) may be helically twisted around the conductors as the separator and the pair 105 are twisted together. The first portion or dielectric portion may assist in maintaining spacing between the individual conductors of the twisted pair 105 and/or maintaining the positions of one or both of the individual conductors. The second portion(s) or shielding portions may extend from the first portion, and the second portion(s) may be individually and/or collectively wrapped around the twisted pair conductors in order to form a shield layer.

As set forth above, a wide variety of different components of a cable may function as shielding elements. In certain embodiments, the electrically conductive material or other shielding material incorporated into a shield element may be relatively continuous along a longitudinal length of a cable. For example, a relatively continuous foil shield or braided shield may be utilized. In other embodiments, a shield element may be formed as a discontinuous shield element having a plurality of isolated patches of shielding material. For example, a plurality of discontinuous patches of electrically conductive material may be incorporated into the shield element (or into various components of a shield element), and gaps or spaces may be present between adjacent patches in a longitudinal direction. A wide variety of different patch patterns may be formed as desired in various embodiments, and a patch pattern may include a period or definite step. In other embodiments, patches may be randomly formed or situated on a base or carrier layer.

A wide variety of suitable shielding materials may be utilized to form patched of shielding material. Examples of suitable electrically conductive materials that may be utilized include, but not limited to, metallic material (e.g., silver, copper, nickel, steel, iron, annealed copper, gold, aluminum, etc.) metallic alloys, conductive composite materials, etc. Indeed, suitable electrically conductive materials may include any material having an electrical resistivity of less than approximately $1 \times 10^{-7}$ ohm meters at approximately 20° C. In certain embodiments, an electrically conductive material may have an electrical resistivity of less than approximately $3 \times 10^{-8}$ ohm meters at approximately 20° C. Each electrically conductive patch may have any desired thickness, such as a thickness of about 0.5 mils (about 13 microns) or greater. For example, electrically conductive patches may have a thickness between approximately 1.0 mil (25.4 microns) and approximately 3.0 mils (about 76.2 microns). In some applications, signal performance may benefit from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. A greater thickness may limit negative insertion loss characteristics.

A wide variety of patch lengths (e.g., lengths along a longitudinal direction of a cable) may be utilized. As desired, the dimensions of the segments and/or electrically conductive patches can be selected to provide electromagnetic shielding over a specific band of electromagnetic frequencies or above or below a designated frequency threshold. In various embodiments, the segments and/or patches can have a length of about 0.5, 0.75, 1.0, 1.5, 2.0, 2.5, 3.0, 3.5, 4.0, 4.5, or 5.0 meters or in a range between any two of these values. In other embodiments, lengths may be less than 0.5 meters or greater than 5.0 meters.

Additionally, individual patches may be separated from one another so that each patch is electrically isolated from the other patches. That is, the respective physical separations between the patches may impede the flow of electricity between adjacent patches. In certain embodiments, the physical separation of patches may be formed by gaps or spaces, such as gaps of dielectric material. In other embodiments, the physical separation of certain patches may result from the overlapping of shield segments. For example, a shield element may be formed from a plurality of discrete segments, and adjacent segments may overlap one another. The respective physical separations between the patches may impede the flow of electricity between adjacent patches. A wide variety of suitable gap distances or isolation gaps may be provided between adjacent patches. For example, the isolation spaces can have a length of about 0.5, 1.0, 1.5, 2.0, 2.5, 3.0, 3.5, or 4 millimeters or in a range between any two of these values. In one example embodiment, each patch may be at least two meters in length, and a relatively small isolation gap (e.g., 4 millimeters or less, about 1/16 of an inch, etc.) may be formed between adjacent patches. In certain embodiments, patches may be formed as first patches (e.g., first patches on a first side of a dielectric material), and second patches may be formed on an opposite side of a dielectric base layer. For example, second patches may be formed to correspond with the gaps or isolation spaces between the first patches. As desired, patches may have a wide variety of different shapes and/or orientations. For example, the segments and/or patches may have a rectangular, trapezoidal, or parallelogram shape. A few example shapes for patches are described in greater detail below with reference to FIGS. 5A-5C.

As desired in various embodiments, a wide variety of other materials may be incorporated into the cable 100. For example, as set forth above, a cable may include any number of conductors, twisted pairs, optical fibers, and/or other transmission media. As desired, a cable may include a wide variety of strength members, swellable materials (e.g., aramid yarns, blown swellable fibers, etc.), insulating materials, dielectric materials, flame retardants, flame suppressants or extinguishants, gels, and/or other materials. The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

Figure 2:
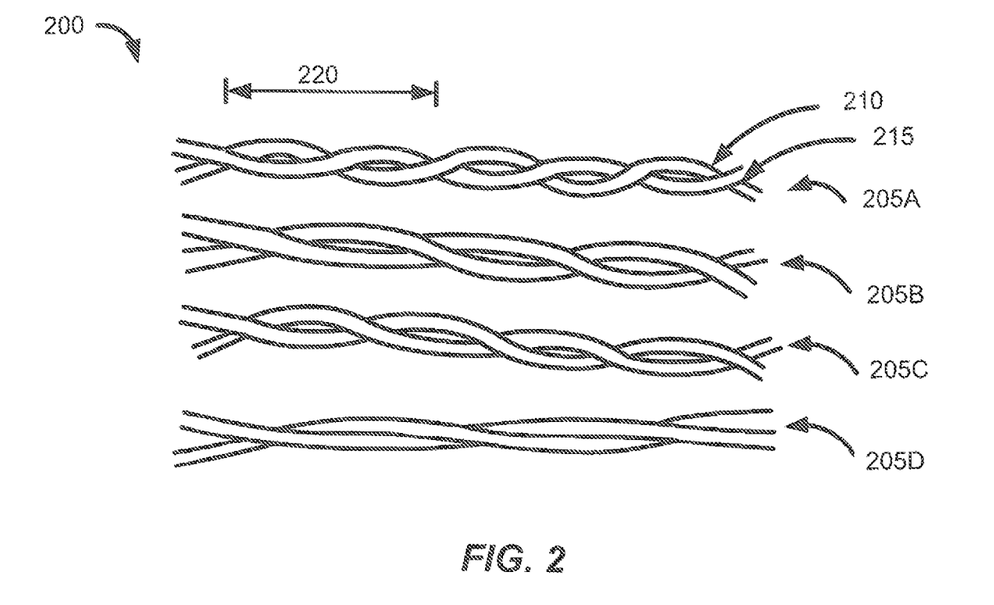
FIG. 2 illustrates a plurality of conductors that are twisted together to form a plurality of twisted pairs that may be utilized in various embodiments of the disclosure.

FIG. 2 illustrates a plurality of conductors 200 that are twisted together to form a plurality of twisted pairs that may be utilized in various embodiments of the disclosure. A cable, such as the cable 100 illustrated in FIG. 1, may include a plurality of twisted pairs. For example, four twisted pairs 205A-D may be formed from a plurality of conductors 200, and the twisted pairs 205A-D may be incorporated into a cable. Each twisted pair (generally referred to as twisted pair 205) may include two conductors 210, 215, that are twisted around each other or twined together in a suitable twist direction. The two conductors 210, 215 may be twisted together with any suitable twist lay 220, which is the longitudinal length required for the two conductors 210, 215 to make a complete twist around one another.

In certain embodiments, each of the twisted pairs 205A-D may have a respective twist lay included in a range between approximately 0.292 inches and approximately 0.504 inches. In other embodiments, each of the twisted pairs 205A-D may have a respective twist lay falling within any of the other suitable ranges discussed above with reference to FIG. 1.

Additionally, in certain embodiments, each of the twisted pairs 205A-D may have a different twist lay. For example, in a four twisted pair cable, a first twisted pair 205A may have a twist lay between approximately 0.292 inches and approximately 0.357 inches; a second twisted pair 205B may have a twist lay between approximately 0.377 inches and approximately 0.461 inches; a third twisted pair 205C may have a twist lay between approximately 0.311 inches and approximately 0.380 inches; and a fourth twisted pair 205D may have a twist lay between approximately 0.412 inches and approximately 0.504 inches.

Figure 3:
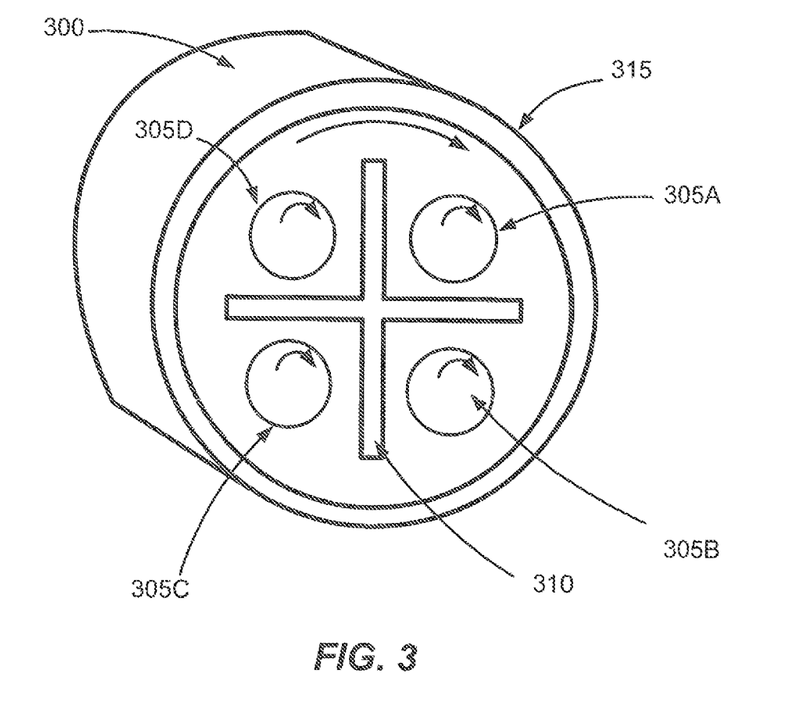
FIG. 3 illustrates an example cable core in which a plurality of twisted pairs are twisted together with an overall twist direction or bunch lay, according to illustrative embodiments of the disclosure.

FIG. 3 illustrates an example cable core 300 in which a plurality of twisted pairs 305A-D are twisted together with an overall twist direction or bunch lay, according to illustrative embodiments of the disclosure. As shown, each of the twisted pairs 305A-D may be twisted in a similar direction, such as a clockwise direction. Additionally, the plurality of twisted pairs 305A-D may be twisted together in an overall twist direction that matches that of each of the twisted pairs. As a result, the overall twisting may tighten or narrow the individual twist lays of each of the twisted pairs 305A-D. In other embodiments, one or more of the twisted pairs 305A-D may have a twist direction that is opposite that of the overall twist direction. As a result, the twist lays of the one or more twisted pairs may be loosened or lengthened by the overall twisting. With additional reference to FIG. 3, in certain embodiments, a separator 310 may be positioned between two or more of the plurality of twisted pairs 305A-D. Additionally, one or more wrap or sheath layers 315, such as an overall shield layer and/or a jacket layer may be formed around the plurality of twisted pairs 305A-D. The cable core 600 includes a plurality of twisted pairs that are twisted together in a bunch direction 605.

Figure 4A:
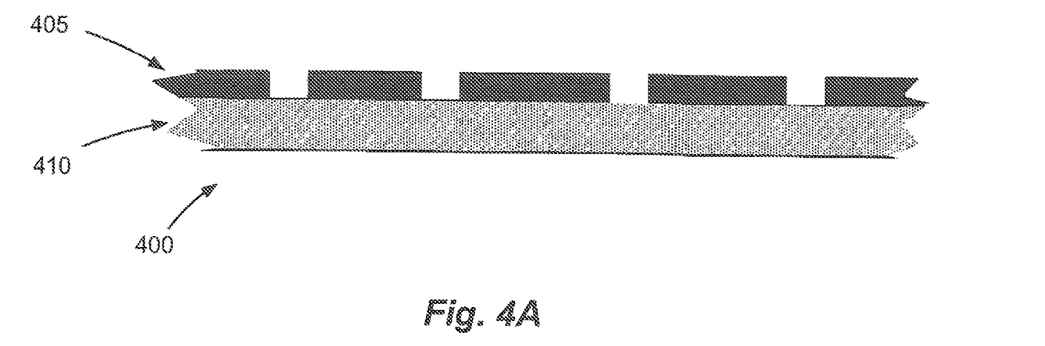
FIGS. 4A-4C are cross-sectional views of example structures that may be utilized to form shield layers or other shielding components, according to illustrative embodiments of the disclosure.
Figure 4B:
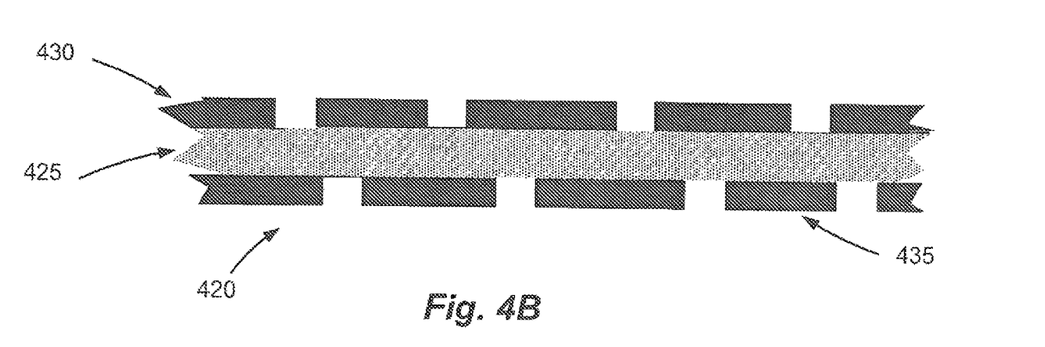
Figure 4C:
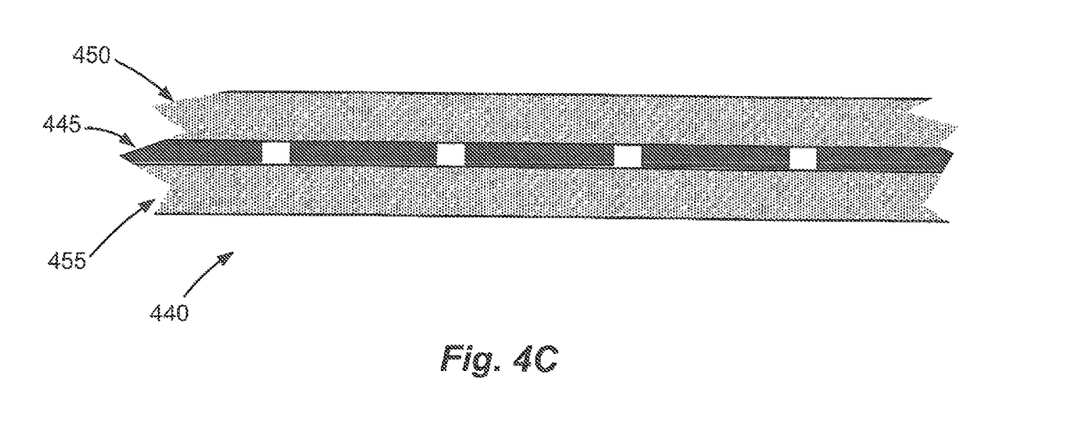

As set forth above, in certain embodiments, one or more shielding elements, such as one or more shield layers and/or a shielding separator, may be incorporated into a cable. A shield layer may be formed with any number of suitable layers of material and/or layer configurations. FIGS. 4A-4C illustrate cross-sectional views of example tapes or flexible structures that may be utilized to form certain shield elements, according to illustrative embodiments of the disclosure. FIG. 4A illustrates an example tape or flexible structure 400 that includes one or more patches of electrically conductive material 405 (or other shielding material) formed on a dielectric layer 410. Gaps or spaces may exist between adjacent patches along a longitudinal length of the structure 400. FIG. 4B illustrates an example tape or flexible structure 420 in which electrically conductive material (or other shielding material) is formed on opposite sides of a dielectric layer 425. As shown, first electrically conductive material 430 may be formed on a first surface or side of the dielectric layer 425, and the electrically conductive material 430 may include discontinuous patches of material with spaces or gaps formed between adjacent patches. Additional or second electrically conductive material 435 may be formed on an opposite surface or side of the dielectric layer 425. For example, patches of electrically conductive material may be formed on an opposite side of the dielectric layer 425 to cover gaps between adjacent patches formed on the first side. FIG. 4C illustrates another example tape or flexible structure 440 in which electrically conductive material 445 (or other shielding material) is sandwiched between two suitable dielectric layers 450, 455. A wide variety of other constructions may be utilized as desired to form a shield element. For example, a shield element may be formed from a shielding material. Indeed, any number of dielectric, electrically conductive, shielding, and/or other layers may be utilized. The constructions illustrated in FIGS. 4A-4C are provided by way of example only.

Figure 5A:
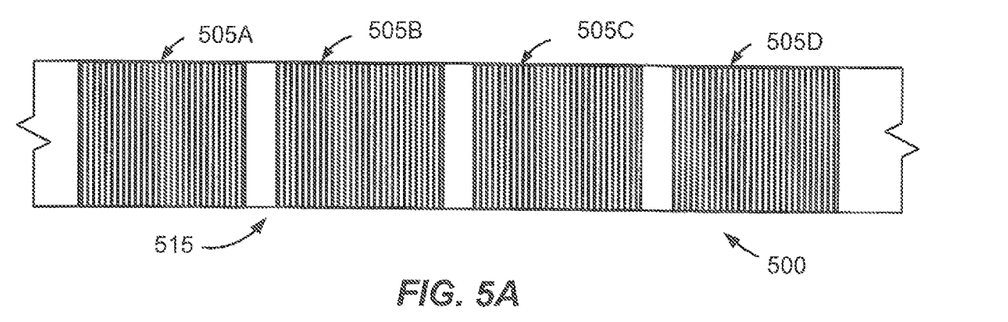
FIGS. 5A-5C are top level views of example structures that may be utilized to form shield layers or other shielding components, according to illustrative embodiments of the disclosure.
Figure 5B:
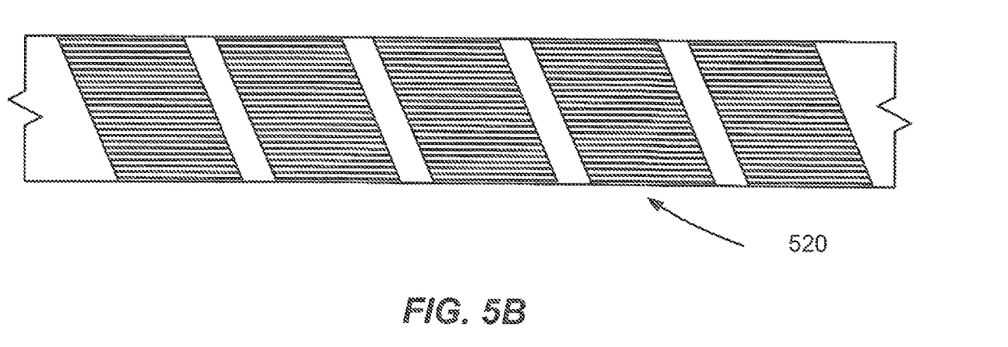
Figure 5C:
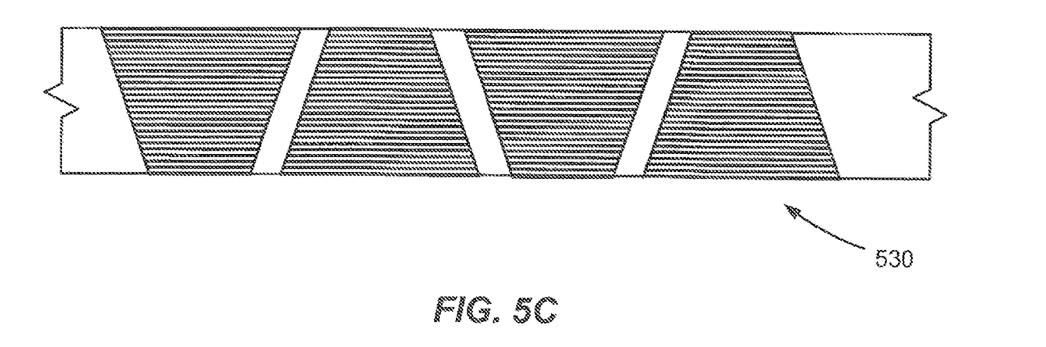

Additionally, a wide variety of different electrically conductive patch configurations or other configuration of shielding material may be utilized in conjunction with shielding elements, such as shield layers. FIGS. 5A-5C illustrate top level views of example tape or flexible structures that may be utilized to form certain shield elements. With reference to FIG. 5A, a top level view of a first example flexible structure 500 is illustrated. The structure 500 may include any number of rectangular patches of electrically conductive material (or other shielding material), such as patches 505A-D formed on a dielectric material. As desired in various embodiments, the patches 505A-D may include any desired lengths, and any desired gap 510 or separation distance may be provided between adjacent patches. In certain embodiments, the patches may be formed in accordance with a repeating pattern having a definite step or period. As desired, additional patches may be formed on an opposing side of the dielectric material to cover the gaps 510. Additionally, in certain embodiments, each patch 505A-D may have a width that spans across the structure 500. In other embodiments, other patch widths may be utilized. For example, a plurality of discontinuous patches may be positioned across a width dimension of the structure 500.

FIG. 5B illustrates a top level view of another example flexible structure 420 that may be utilized in the formation of a shield element. The flexible structure 420 may include any number of electrically conductive patches (or patches formed from other shielding material) having the shape of a parallelogram. In other words, the patches may be formed at an angle within one or more areas of the structure 520. As shown, the patches may be formed at an acute angle with respect to the width dimension of the structure 520. In certain embodiments, the acute angle facilitates manufacturing and enhances patch-to-substrate adhesion. Additionally, the acute angle may also facilitate the covering of opposing isolating spaces or gaps. In certain embodiments, benefit may be achieved when the acute angle is about 45 degrees or less. In other embodiments, benefit is achieved when the acute angle is about 35 degrees or less, about 30 degrees or less, about 25 degrees or less, about 20 degrees or less, or about 15 degrees or less. In other embodiments, benefit is achieved when the acute angle is between about 12 and 40 degrees. In certain embodiments, the acute angle may be in a range between any two of the degree values provided in this paragraph.

FIG. 5C illustrates a top level view of another example flexible structure 530 that may be utilized in the formation of a shielding element. The structure 530 may include any number of electrically conductive patches (or patches of another shielding material) having a trapezoidal shape. In certain embodiments, the orientation of adjacent trapezoidal patches may alternate. Similar to the patch pattern illustrated in FIG. 5B, the trapezoidal patches may provide manufacturing and/or shielding benefits. A wide variety of other suitable patch configurations may be utilized as desired in various embodiments. For example, triangular, square, and/or other patches may be utilized. As another example, a structure may be formed with relatively continuous shielding material either with or without a dielectric substrate layer.

Figure 6:
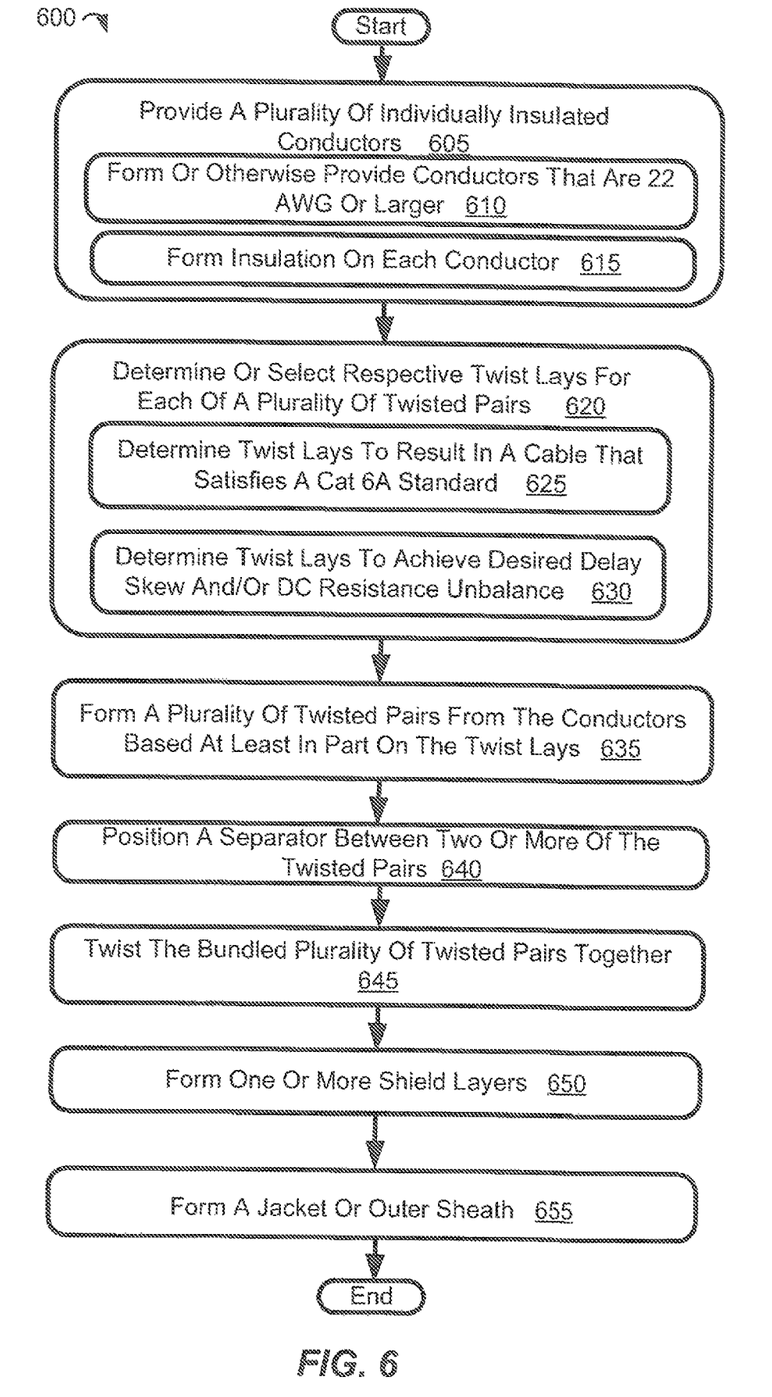
FIG. 6 is a flowchart of an example method for forming a twisted pair communication cable in accordance with various embodiments of the disclosure.

FIG. 6 is a flowchart of an example method 600 for forming a twisted pair communication cable in accordance with various embodiments of the disclosure. The method 600 may be utilized to form one or more of the cables suitable for use in PoE applications, such as the cable 100 illustrated in FIG. 1. The method 600 may begin at block 605, in which a plurality of individually insulated conductors may be provided. According to an aspect of the disclosure, each of the insulated conductors may be 22 AWG or greater. In other words, each conductor may have a diameter and/or cross-sectional area that is greater than or equal to required minimum dimensions for 22 AWG conductors. For example, an electrical conductor may have a diameter that is greater than or equal to approximately 0.0240 inches (0.6096 mm) or other suitable dimensions. As desired, the provided conductors and/or twisted pairs subsequently formed from the conductors may be capable of transmitting a desired power signal for PoE applications. For example, four twisted pairs formed by the conductors may be capable of transmitting a power signal of approximately 100 Watts of power at approximately 1.0 ampere per pair over a distance of approximately 100 meters with at least approximately 88% efficiency at a temperature of approximately twenty degrees Celsius (20° C.).

A wide variety of suitable method and/or techniques may be utilized to provide a plurality of conductors. For example, in certain embodiments, a plurality of suitable preformed insulated conductors may be provided. In other embodiments, a plurality of conductors (e.g., uninsulated conductors, etc.) may be formed or otherwise provided at block 610. For example, suitable input material (e.g., copper, etc.) may be drawn through one or more dies or otherwise processed in order to obtain conductor material having a desirable diameter or cross-sectional area. As another example, pre-drawn or pre-formed input material may be provided. As yet another example, a plurality of strands of conductive material or other input material may be twisted together in order to provide one or more conductors.

At block 615, suitable insulation may be formed around each of the conductors. For example, conductors may be fed from drawing devices, reels, or other devices, and one or more suitable extrusion devices may be utilized to extrude one or more layers of insulation material onto each conductor. As set forth in greater detail above with reference to FIG. 1, a wide variety of suitable materials and/or combinations of material may be utilized to form insulation. For example, the conductors may be insulated with a material that includes fluorinated ethylene propylene ("FEP"), such as a relatively solid FEP material.

At block 620, respective twist lays for each of a plurality of twisted pairs to be incorporated into a cable may be selected, calculated, or otherwise determined. In certain embodiments, a different respective twist lay may be determined for each twisted pair. As desired, the respective twist lays for the twisted pairs may be selected, calculated, or determined in order to result in a cable that satisfies one or more standards and/or electrical requirements. For example, at block 625, twist lays may be determined such that a cable satisfies one or more electrical requirements of a Category 6A standard, such as the TIA 568 standard set forth by the Telecommunications Industry Association. As another example, at block 630, twist lays may be determined such that a cable has a desired propagation delay skew, such as a propagation delay skew of less than approximately forty-five nanoseconds (45 ns) per one hundred meters (100 m). As another example, twist lays may be determined such that a cable has a desired direct current resistance unbalance between pairs, such as a direct current resistance unbalance between pairs of less than approximately one hundred milliohms (100 mΩ) per one hundred meters (00 m). Twist lays may be determined in order to satisfy a wide variety of other electrical requirements as desired in various embodiments.

In certain embodiments, each of the determined twist lays may be included in a range between approximately 0.292 inches and approximately 0.504 inches or in any other suitable range discussed herein. In an example four twisted pair cable, such as the cable 100 illustrated in FIG. 1, a first determined twist lay may be between approximately 0.292 inches and approximately 0.357 inches; a second determined twist lay may be between approximately 0.377 inches and approximately 0.461 inches; a third determined twist lay may be between approximately 0.311 inches and approximately 0.380 inches; and a fourth determined twist lay may be between approximately 0.412 inches and approximately 0.504 inches. Other suitable twist lay ranges may be utilized as desired, such as any of the ranges discussed above with reference to FIG. 1.

Once respective twist lays have been selected or otherwise determined at block 620, operations may continue at block 635. At block 635, a plurality of twisted pairs may be formed from the plurality of insulated conductors based at least in part on the selected or determined twist lays. In other words, pairs of insulated conductors may be twisted together in accordance with the determined twist lays. As desired, an overall bunch lay or overall twist may be taken into consideration when twisted pairs are initially formed. For example, an initial twist lay may be altered (e.g., loosened or tightened) during the formation of an overall twisting operation of the plurality of twisted pairs. An initial twist lay for a twisted pair may account for the overall twisting operation such that a desired final or resultant twist lay is formed for the twisted layer following the overall twisting.

Any number of twisted pairs may be formed as desired in various embodiments, such as four twisted pairs. Additionally, in certain embodiments, the plurality of twisted pairs may be formed during cable construction (e.g., in an in-line cable construction process). In other embodiments, the plurality of twisted pairs may be formed prior to cable construction (e.g., in a separate process in which the resulting twisted pairs are taken up on reels and subsequently provided to a cabling process that assembles and jackets a cable). In yet other embodiments, preformed twisted pairs may be obtained from an outside source or third party and provided to a cabling process.

Once a plurality of twisted pairs of conductors have been formed or otherwise provided, operations may continue at block 640. At block 640, which may be optional in certain embodiments, a suitable separator may be positioned between two or more of the plurality of twisted pairs. For example, a cross-filler or other suitable separator may be provided. As discussed in greater detail above with reference to FIG. 1, a separator may have a wide variety of suitable constructions and/or dimensions.

At block 645, the plurality of twisted pair conductors may be twisted together. For example, the plurality of twisted pairs may be provided to a twisting or twinning device that twists the plurality of pairs together with an overall bunch or twist lay. In certain embodiments, the overall twisting may modify one or more initial twist lays of the twisted pairs. For example, the twist lays of twisted pairs having a twisting direction that matches that of the overall twist may be tightened or narrowed. As another example, the twist lays of twisted pairs having a twisting direction that is opposite that of the overall twist may be loosened or lengthened. In certain embodiments, the selected or determined twisted lays may be the final twist lays following the overall twisting.

At block 650, which may be optional in certain embodiments, one or more shield layers may be formed. For example, an overall shield layer may be formed around the plurality of twisted pairs. In other embodiments, individual shield layers may be formed around one or more twisted pairs prior to the overall twisting operation. Indeed, any number of shield layers may be incorporated into a cable, and each shield layer may be formed around one or more twisted pairs. As set forth in greater detail above with reference to FIG. 1, each shield layer may be formed with a wide variety of suitable constructions and/or dimensions. At block 655, a jacket may be formed around the twisted pairs and/or other components of the cable. For example, one or more suitable extrusion devices may be utilized to form a jacket around the twisted pairs. The method 600 may end after block 655.

As desired, the method 600 may include more or less operations than those illustrated in FIG. 6. For example, one or more additional components may be incorporated into a cable. Additionally, as desired, certain operations of the method 600 may be formed in parallel or in a different order than that set forth in FIG. 6. Indeed, the method 600 is provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming a Category 6A communications cable, the method comprising:
    providing four pairs of individually insulated conductors, wherein the respective conductors of a first pair and a third pair included in the four pairs each have a diameter of at least 0.0254 inches and the respective conductors of a second pair and a fourth pair included in the four pairs each have a diameter of at least 0.0245 inches;
    selecting a respective twist lay for each of the four pairs to result in the communications cable having a propagation delay skew of less than 45 nanoseconds per one hundred meters and a direct current resistance unbalance between every two of the four pairs of less than one hundred milliohms per one hundred meters;
    respectively twisting the conductors of each of the four pairs to have the selected twist lays; and
    forming a jacket around the four twisted pairs.

2. The method of claim 1, wherein selecting a respective twist lay for each of the pairs comprises:
    selecting a first twist lay between 0.292 inches and 0.357 inches for the first pair;
    selecting a second twist lay between 0.377 inches and 0.461 inches for the second pair;
    selecting a third twist lay between 0.311 inches and 0.380 inches for the third pair; and
    selecting a fourth twist lay between 0.412 inches and 0.504 inches for the fourth pair.

3. The method of claim 1, wherein the four twisted pairs are capable of transmitting 100 Watts at 1.0 ampere per pair over a distance of 100 meters with at least 88% efficiency.

4. The method of claim 1, further comprising positioning a separator between the four twisted pairs.

5. The method of claim 1, wherein providing four pairs of individually insulated conductors comprises providing four pairs of conductors insulated with a material comprising fluorinated ethylene propylene.

6. The method of claim 1, further comprising:
    forming a shield comprising electrically conductive material around at least one of the four twisted pairs.

7. The method of claim 6, wherein the shield comprises a plurality of patches of electrically conductive material that are electrically isolated from one another.

8. A method for forming a communications cable, the method comprising:
   providing four pairs of individually insulated conductors, the respective conductors of a first and third pair included in the four pairs each having a diameter of at least 0.0254 inches and the respective conductors of a second and fourth pair included in the four pairs each having a diameter of at least 0.0245 inches;
   determining respective twist lays for each of the four pairs to result in the communications cable satisfying Telecommunications Industry Association standard ANSI/TIA 568-C.2 for Category 6A cable, wherein determining respective twist lays comprises:
      determining a first twist lay for a first of the plurality of pairs between 0.292 inches and 0.357 inches;
      determining a second twist lay for a second of the plurality of pairs between 0.377 inches and 0.461 inches;
      determining a third twist lay for a third of the plurality of pairs between 0.311 inches and 0.380 inches; and
      determining a fourth twist lay for a fourth of the plurality of pairs between 0.412 inches and 0.504 inches;
   respectively twisting the conductors of each of four pairs to have the determined twist lays, wherein the four twisted pairs are capable of transmitting 100 Watts at 1.0 ampere per pair over a distance of 100 meters with at least 88% efficiency; and
   forming a jacket around the plurality of twisted pairs.

9. The method of claim 8, wherein determining respective twist lays comprises determining respective twist lays that result in the communications cable having a propagation delay skew of less than 45 nanoseconds per one hundred meters and a direct current resistance unbalance between every two of the four pairs of less than one hundred milliohms per one hundred meters.

10. The method of claim 8, wherein providing four pairs of individually insulated conductors comprises providing four pairs of conductors insulated with a material comprising fluorinated ethylene propylene.

11. The method of claim 8, further comprising positioning a separator between the four pairs.

12. The method of claim 8, further comprising:
   forming a shield comprising a plurality of discontinuous patches of electrically conductive material around at least one of the four pairs.

13. A method for forming a Category 6A communications cable, the method comprising:
   providing a plurality of individually insulated conductors, wherein a first portion of the plurality of conductors each have a diameter of at least 0.0254 inches and a second portion of the plurality of conductors each have a diameter of at least 0.0245 inches;
   forming four twisted pairs from the plurality of conductors including a first and third pair from the first portion of the plurality of conductors and a second and fourth pair from the second portion of the plurality of conductors, wherein each of the four pairs has a twist lay selected to result in the communications cable having a propagation delay skew of less than 45 nanoseconds per one hundred meters and a direct current resistance unbalance between every two of the plurality of twisted pairs of less than one hundred milliohms per one hundred meters; and
   forming a jacket around the four twisted pairs.

14. The method of claim 13, wherein forming four twisted pairs comprises forming four twisted pairs that are capable of transmitting 100 Watts at 1.0 ampere per pair over a distance of 100 meters with at least 88% efficiency.

15. The method of claim 13, wherein forming four twisted pairs comprises forming four twisted pairs having different respective twist lays included in a range between 0.292 inches and 0.504 inches.

16. The method of claim 13, wherein providing a plurality of individually insulated conductors comprises providing a plurality of conductors insulated with a material comprising fluorinated ethylene propylene.

17. The method of claim 13, further comprising positioning a separator between the four pairs.

18. The method of claim 13, further comprising:
   forming a shield comprising a plurality of discontinuous patches of electrically conductive material around at least one of the four twisted pairs.

19. The method of claim 13, wherein forming four twisted pairs comprises:
   forming the first pair with a first twist lay between 0.292 inches and 0.357 inches;
   forming the second pair with a second twist lay between 0.377 inches and 0.461 inches;
   forming the third pair with a third twist lay between 0.311 inches and 0.380 inches; and
   forming the fourth pair with a fourth twist lay between 0.412 inches and 0.504 inches.

* * * * *